(12) United States Patent
Aoki

(10) Patent No.: US 11,360,723 B2
(45) Date of Patent: Jun. 14, 2022

(54) MOBILE TERMINAL DEVICE TRANSMITTING PRINT DATA TO IMAGE FORMING APPARATUS THROUGH WIRELESS COMMUNICATION WITH NETWORK, NON-TRANSITORY COMPUTER READABLE MEDIUM STORING MOBILE TERMINAL PROGRAM, AND IMAGE FORMING APPARATUS

(71) Applicant: FUJIFILM Business Innovation Corp., Tokyo (JP)

(72) Inventor: Masanori Aoki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 189 days.

(21) Appl. No.: 16/442,570

(22) Filed: Jun. 17, 2019

(65) Prior Publication Data

US 2020/0004479 A1  Jan. 2, 2020

(30) Foreign Application Priority Data

Jun. 27, 2018 (JP) .............................. JP2018-122185

(51) Int. Cl.
*G06F 3/12* (2006.01)
*H04N 1/00* (2006.01)

(52) U.S. Cl.
CPC ............ *G06F 3/1236* (2013.01); *G06F 3/122* (2013.01); *G06F 3/1204* (2013.01);
(Continued)

(58) Field of Classification Search
CPC .................................................. G06F 3/1236
(Continued)

(56) References Cited

U.S. PATENT DOCUMENTS

| 10,079,955 B2 | 9/2018 | Shibao |
| 2011/0019228 A1* | 1/2011 | Uchikawa .......... H04N 1/32534 358/1.15 |

(Continued)

FOREIGN PATENT DOCUMENTS

| JP | 2012138073 | 7/2012 |
| JP | 2016103862 | 6/2016 |

(Continued)

OTHER PUBLICATIONS

"Office Action of Japan Counterpart Application", dated Apr. 19, 2022, with English translation thereof, p. 1-p. 6.

*Primary Examiner* — Jacky X Zheng
(74) *Attorney, Agent, or Firm* — JCIPRNET

(57) ABSTRACT

A mobile terminal device includes a print data selecting unit that selects print data in response to a user operation, a communication establishing unit that establishes wireless communication with a network, a detection unit that detects an event in which an image forming apparatus connected to a first network is selected as a printing destination of the print data, an obtainment unit that obtains the print data from a storage destination connected to a second network different from the first network through wireless communication with the second network established by the communication establishing unit after the detection unit detects the event, in a case where the print data is stored in the storage destination, and a data transmitting unit that transmits the print data obtained by the obtainment unit to the image forming apparatus through wireless communication with the first network established by the communication establishing unit.

9 Claims, 10 Drawing Sheets

(52) U.S. Cl.
CPC ....... *H04N 1/00477* (2013.01); *G06F 3/1286* (2013.01); *G06F 3/1289* (2013.01); *G06F 3/1292* (2013.01)

(58) Field of Classification Search
USPC ........................................... 358/1.13
See application file for complete search history.

(56) References Cited

U.S. PATENT DOCUMENTS

| | | | |
|---|---|---|---|
| 2013/0021643 A1* | 1/2013 | Nuggehalli | H04N 1/00331 358/1.15 |
| 2013/0124737 A1* | 5/2013 | Tachibana | H04N 1/00 709/227 |
| 2016/0301824 A1 | 10/2016 | Shibao | |
| 2017/0277496 A1* | 9/2017 | Mihira | G06K 7/1095 |
| 2018/0352110 A1 | 12/2018 | Shibao | |
| 2019/0303048 A1* | 10/2019 | Suzuki | G06F 3/1297 |
| 2020/0004469 A1* | 1/2020 | Tomida | G06F 3/1231 |

FOREIGN PATENT DOCUMENTS

| | | |
|---|---|---|
| JP | 2016201702 | 12/2016 |
| JP | 2018077918 | 5/2018 |

\* cited by examiner

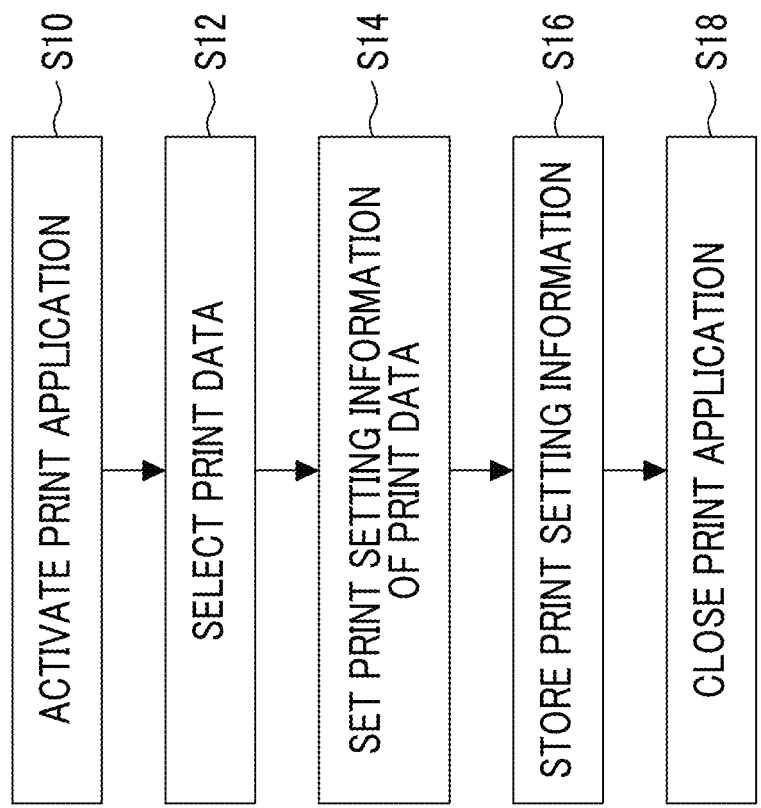

FIG. 3

| No | JOB ID | PRINT SETTING INFORMATION | AMOUNT OF MONEY | FILE OBTAINING DESTINATION | ACCESS INFORMATION | TERMINAL INFORMATION | POSITIONAL INFORMATION |
|---|---|---|---|---|---|---|---|
| 1 | JOB1 | COLOR: FULL COLOR, SHEET: A4, Nup: 2up, DOUBLE-SIDED PRINTING: SINGLE-SIDED BINDING | 600 YEN | file://aaaaa/bbbbb/Document.pdf | | WWWWW | XXXXX |
| 2 | JOB2 | COLOR: FULL COLOR, SHEET: L SIZE, Nup: NONE, DOUBLE-SIDED PRINTING: NONE | 30 YEN | https://cloudservice/storage/Photo.jpg | (AUTHENTICATION INFORMATION) | YYYYY | ZZZZZ |

FIG. 5

| No | SSID |
|---|---|
| 1 | Softbank-001 |
| 2 | Docomo-001 |
| 3 | CVS-PrintService |
| 4 | ... |

FIG. 6

READ PRINT SETTING INFORMATION FROM QR CODE READER — S50

ACTIVATE Wi-Fi — S52

ACCEPT PRINT FEE — S54

OBTAIN PRINT DATA — S56

OBTAIN TERMINAL INFORMATION AND POSITIONAL INFORMATION — S57

PERFORM PRINTING — S58

MOBILE TERMINAL DEVICE TRANSMITTING PRINT DATA TO IMAGE FORMING APPARATUS THROUGH WIRELESS COMMUNICATION WITH NETWORK, NON-TRANSITORY COMPUTER READABLE MEDIUM STORING MOBILE TERMINAL PROGRAM, AND IMAGE FORMING APPARATUS

CROSS-REFERENCE TO RELATED APPLICATIONS

This application is based on and claims priority under 35 USC 119 from Japanese Patent Application No. 2018-122185 filed Jun. 27, 2018.

BACKGROUND

(i) Technical Field

The present invention relates to a mobile terminal device, a non-transitory computer readable medium storing a mobile terminal program, and an image forming apparatus.

(ii) Related Art

A technology that performs a print setting in an image forming apparatus by using a mobile terminal device such as a smartphone is known.

JP2016-103862A describes an image forming apparatus having a function of performing wireless communication (NFC, Wi-Fi (registered trademark), or Bluetooth (registered trademark)) with a mobile terminal device at a short distance. In a case where the image forming apparatus recognizes a mobile terminal device present in a range in which communication is able to be performed, the image forming apparatus requests the mobile terminal device to activate an application for setting a print job which is installed in advance, and accepts the job setting from the application.

JP2012-138073A discloses a system in which a user uploads a terminal identifier and document data to a server connected to a network from a mobile terminal device and the image forming apparatus downloads the terminal identifier and the document data from the server. The image forming apparatus transmits and receives the amount of money information charged or print approval information to and from the mobile terminal device having the terminal identifier through the wireless communication at the short distance.

JP2016-201702A discloses an aspect in which a setting in a case where data is transmitted from an image processing apparatus to an external device by an electronic mail is performed by using a mobile terminal device of a user. In this example, communication using the NFC is initially performed between the image processing apparatus and the mobile terminal device, and information necessary for performing communication using a wireless LAN is transmitted and received. Subsequently, the image processing apparatus and the mobile terminal device perform the communication using the wireless LAN, and transmission setting information retained in the mobile terminal device is transferred to an image processing apparatus.

SUMMARY

A mobile terminal device stores data such as image data or document data within the mobile terminal device. However, only outline information of the data may be stored within the mobile terminal device, for example, and data entity may be stored in a server connected to a network. For example, in a case where the user selects the data stored in the server as the print data and attempts to print by the image forming apparatus connected to a network isolated from the server, it is necessary to download the print data to the mobile terminal device in order to transmit the print data from the mobile terminal device to the image forming apparatus. However, for example, in a case where the mobile terminal device is not able to simultaneously perform wireless connection with a plurality of networks and communication between the mobile terminal device and the image forming apparatus is established, since the print data is not able to be transmitted to the mobile terminal device from the server later, the print data is not able to be transmitted to the image forming apparatus from the mobile terminal device, and thus, the printing is not able to be performed or the printing is difficult. For example, in a case where the mobile terminal device is able to perform the simultaneous connection with the plurality of networks through the wireless communication, since networks connected to the server and the image forming apparatus are different, a situation in which a failure occurs in the transmission of the print data is considered.

Aspects of non-limiting embodiments of the present disclosure relate to a mobile terminal device, a non-transitory computer readable medium storing a mobile terminal program, and an image forming apparatus which resolve or reduce a state in which transmission of print data to an image forming apparatus is not able to be performed or is difficult since the print data is stored in a storage destination connected to a network different from a network connected to the image forming apparatus in a case where the print data is transmitted to the image forming apparatus from a mobile terminal device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a mobile terminal device including a print data selecting unit that selects print data in response to a user operation, a communication establishing unit that establishes wireless communication with a network, a detection unit that detects an event in which an image forming apparatus connected to a first network is selected as a printing destination of the print data, an obtainment unit that obtains the print data from a storage destination connected to a second network different from the first network through wireless communication with the second network established by the communication establishing unit after the detection unit detects the event, in a case where the print data is stored in the storage destination, and a data transmitting unit that transmits the print data obtained by the obtainment unit to the image forming apparatus through wireless communication with the first network established by the communication establishing unit.

BRIEF DESCRIPTION OF THE DRAWINGS

Exemplary embodiment(s) of the present invention will be described in detail based on the following figures, wherein:

FIG. 2 is a flowchart showing a print setting in a smartphone;

FIG. 3 is a diagram showing an example of print information including print setting information;

FIG. 5 is a diagram showing an example of an access point to be detected;

FIG. 6 is a flowchart showing processes in a multi-function printer;

DETAILED DESCRIPTION

1. Description of System Configuration

Hereinafter, a system according to an exemplary embodiment on the assumption that a printing service provided by a convenience store is used by a user who visits the convenience store will be described. In the convenience store, a multi-function printer is installed and a service such as printing is provided to a large number of unspecified users who visit the convenience store for a fee in some cases.

Figure 1:
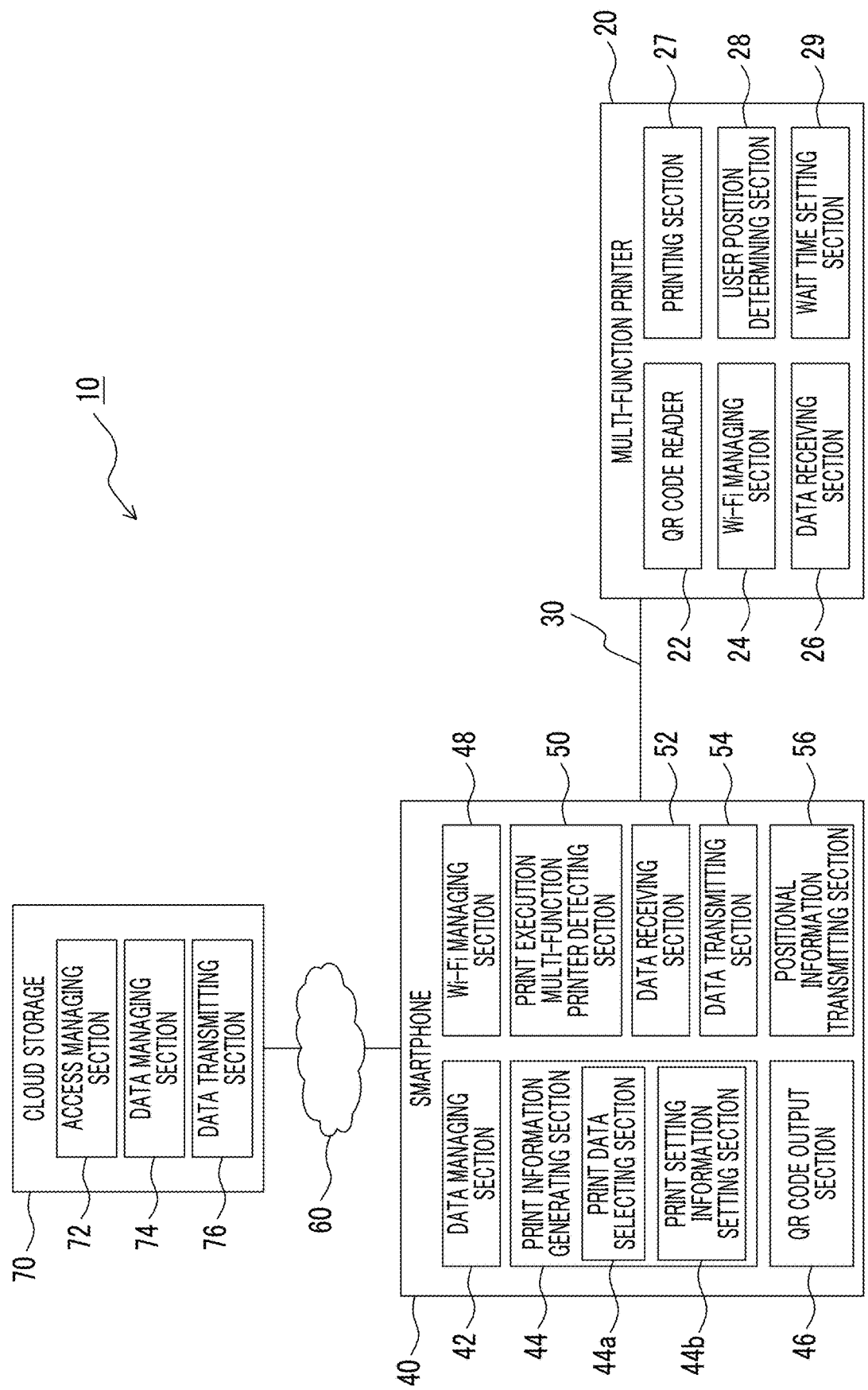
FIG. 1 is a diagram for describing a functional configuration of a printing system according to an exemplary embodiment.

A printing system 10 shown in FIG. 1 includes a multi-function printer 20, a closed network 30, a smartphone 40, the Internet 60, and a cloud storage 70. The multi-function printer 20 is an example of an image forming apparatus, and is installed in the convenience store. The closed network 30 is an example of a first network, and the multi-function printer 20 is connected to the closed network. The smartphone 40 is an example of a mobile terminal device, and is owned by the user. The Internet 60 and the cloud storage 70 connected to the Internet are respectively examples of a second network and a storage destination connected to the second network. Each of these configurations has various functions, and FIG. 1 shows an outline of a functional configuration deeply related to the exemplary embodiment.

The multi-function printer 20 is a complex machine having a print function, a scan function, a copy function, an electronic mail function, and a FAX function. The multi-function printer 20 is constituted by controlling hardware including a printing apparatus, a communication device, and various sensors by using computer hardware and software (programs). The multi-function printer 20 includes a QR code reader 22, a Wi-Fi managing section 24, a data receiving section 26, a printing section 27, a user position determining section 28, and a wait time setting section 29.

The QR code reader 22 is an example of an obtainment unit. The QR code reader optically reads and analyzes a QR code (registered trademark), and decodes print information including print setting information encoded as the QR code. The QR code is a two-dimensional code (two-dimensional image) standardized such that data with a maximum of about several kilobytes is able to be rendered to image information. In a case where a user wants to print with the multi-function printer 20, the user displays a QR code representing print information including print setting information on a screen of the smartphone 40, and presents the displayed QR code to the QR code reader 22.

The Wi-Fi managing section 24 is an example of a communication establishing unit, and activates or deactivates Wi-Fi which is one kind of wireless communication standards. The multi-function printer 20 includes a Wi-Fi antenna therein or in the periphery. The Wi-Fi managing section 24 activates Wi-Fi, and thus, an access point which is a Wi-Fi connection point is installed. In a case where it is necessary to perform Wi-Fi communication with the smartphone 40, the Wi-Fi managing section 24 is connected to the smartphone by activating the Wi-Fi and installing an access point specified by a Service Set IDentifier (SSID). In a case where it is not necessary to perform the communication, the Wi-Fi managing section deactivates the Wi-Fi. There is a plurality of Wi-Fi standards, but any of these standards is designed such that data with a large quantity such as document data and image data as printing target is smoothly transmitted and received.

The data receiving section 26 is an example of a reception unit, and receives print data from the smartphone 40 through the Wi-Fi. Print data described in predetermined language and image format, such as the Portable Document Format (PDF) is received as the print data.

The printing section 27 is an example of a printing unit, and prints an image corresponding to the print data on a sheet. In printing, a setting for the number of sheets to be printed, a setting for a sheet size, a setting for single-sided printing or double-sided printing, and a setting for monochrome printing or color printing are performed according to the print setting information.

The user position determining section 28 is an example of a processing unit, and determines whether or not a position of the smartphone 40 or a position of the user is too far away from the multi-function printer in a printing procedure. In a case where the position of the smartphone or the user is too far away from the multi-function printer, at least one process of a process of stopping the printing, a process of warning the smartphone 40, or a process of notifying of the smartphone is performed. The printing procedure means a procedure from a step of initially receiving an instruction to print to a step of completing the printing on the sheet. For example, a pre-printing procedure such as the reception of the print data and the conversion of the received print data, and a print execution procedure of printing an image on a sheet.

The wait time setting section 29 is an example of a wait time setting unit, and sets a wait time indicating how long to wait for the reception of the print data after the Wi-Fi managing section 24 activates the Wi-Fi antenna. For example, the wait time may be changed depending on whether the print data is stored in the smartphone 40 or the cloud storage 70. In a case where the data receiving section 26 does not receive the print data even though the wait time elapses, a process of stopping the printing is performed.

The closed network 30 is a network to which the multi-function printer 20 is connected. The closed network 30 is a network for accessing from the smartphone 40 to the multi-function printer 20. Various servers managed by an installer of the multi-function printer 20 may be connected to the closed network 30. However, other devices such as a server are not connected to the closed network 30. Only the multi-function printer 20 is simply connected to the closed network in a normal state, and the closed network constitutes a network to which various mobile terminal devices including the smartphone 40 are able to be connected.

The direct connection from the closed network 30 to the Internet 60 is not able to be performed. That is, the connection to the Internet 60 is not able to be physically performed, and the connection to the Internet 60 is not able to be performed without using a barrier such as a firewall or a secure proxy server provided in order to ensure security. Particularly, the smartphone 40 connected to the closed network 30 does not have a special authority in the closed network 30, and is not able to access to the Internet 60. That is, the closed network 30 is a network isolated from the Internet 60 from the viewpoint of at least the smartphone 40. In the multi-function printer 20, the Wi-Fi managing section 24 activates the Wi-Fi antenna, and an access point is installed on the closed network 30. The smartphone 40 can be connected to the multi-function printer 20 through the closed network 30 by accessing to the access point.

The smartphone 40 is able to perform various information processing or communication processing by controlling hardware having an arithmetic function and a communication function by using installed operation system and application programs (applications). The smartphone is provided with a touch panel display, and has a function of displaying a still image or a moving image and receiving a user operation corresponding to the display. For example, user operations according to the exemplary embodiment or various information processing and communication processing corresponding to the user operations are realized by creating and installing a print application having various functions as mentioned above or by using a web browser having such functions as a user interface.

As shown in FIG. 1, the smartphone 40 includes a data managing section 42, a print information generating section 44, a QR code output section 46, a Wi-Fi managing section 48, a print execution multi-function printer detecting section 50, a data receiving section 52, a data transmitting section 54, and a positional information transmitting section 56.

The data managing section 42 manages the storage destination of the data in the smartphone 40. Data entity may be stored in a storage device (the local storage destination) included in the smartphone 40 or may be stored in the cloud storage 70 (the storage destination connected to the Internet 60). The data managing section 42 manages the data by associating data information (size, file type, creation date and time, and thumbnail image) including whether or not there is data (which is able to be generally described in a Uniform Resource Locator (URL) using a https scheme or a file scheme, but is able to be described in another format) with the data entity. Thus, the user generally uses the data without being conscious of whether the data entity is present in the smartphone 40 or the cloud storage 70.

The print information generating section 44 generates print information related to printing. The print information generating section 44 includes a print data selecting section 44a and a print setting information setting section 44b. The print data selecting section 44a is an example of a print data selecting unit, and sets data, as the print data, which is selected by the user who is operating the touch panel. The print setting information setting section 44b is an example of a print setting information setting unit, and sets print setting information indicating a method of printing the print data. The print setting information includes information such as a setting for the number of sheets to be printed, a setting for a sheet size, a setting for an orientation of a sheet, a setting for single-sided printing or double-sided printing, a setting for monochrome printing or color printing, and a setting for the number of pages to be printed on one sheet. The print setting information setting section 44b receives the print setting selected by the user who is operating the touch panel (or who selects default values), and sets the print setting information. The print information generating section 44 generates print information obtained by combining print-related information with the print setting information. Examples of the print-related information include amount of money information to be charged at the time of executing the printing and information (information indicating whether or not there is a file or a file name) for specifying the print data. The information indicating whether or not there is the file is described by data present in a local storage destination of the smartphone 40 or a URL using a file path, and data present in the cloud storage 70 is described by an access method (a token or a URL) to the cloud storage 70. The print-related information includes terminal information that describes a device model or an identification number of the smartphone 40 and positional information that describes the position of the smartphone 40.

The QR code output section 46 is an example of a transmission unit. The QR code output section converts the print information including the print setting information into the QR code, and displays the QR code on the touch panel display. For example, the user displays the QR code by pressing a predetermined button on the print application. The print information is transmitted to the multi-function printer 20 by reading the QR code into the QR code reader 22 of the multi-function printer 20.

The Wi-Fi managing section 48 is an example of a communication establishing unit, and controls the connection or disconnection with or from a connection destination connected to the Wi-Fi. Specifically, the Wi-Fi managing section identifies the SSID of the access point by detecting radio waves output from the access point. The Wi-Fi managing section switches the connection destination connected to the Wi-Fi so as to be connected to the searched connection destination in addition to searching for the SSID as a connecting candidate. For example, in a case where the QR code of the print information including the print setting information is read into the QR code reader 22 of the multi-function printer 20, since the Wi-Fi managing section 24 activates the Wi-Fi, the multi-function printer 20 detects the SSID, and is able to be connected to the connection destination. At time of downloading the data stored in the cloud storage 70, the multi-function printer detects the SSID for accessing to the Internet 60, and is connected to the connection destination.

The print execution multi-function printer detecting section 50 is an example of a detection unit, and detects an event in which the multi-function printer 20 that executes the printing is determined or an event in which a possibility that the multi-function printer will be determined increases. In the exemplary embodiment, after the QR code is displayed by the QR code output section 46, the Wi-Fi managing section 48 detects the SSID (this is an example of access information of wireless communication) of the multi-function printer 20, and thus, the print execution multi-function printer detecting section 50 determines that the event in which the multi-function printer 20 is determined occurs.

The data receiving section 52 is an example of an obtainment unit, and receives the print data from the cloud storage 70 by using the Wi-Fi in a case where the print execution multi-function printer detecting section 50 detects the event in which the multi-function printer 20 is determined. The data transmitting section 54 is an example of a data transmitting unit, and transmits the print data to the multi-function printer 20 by using the Wi-Fi. The positional information transmitting section 56 is an example of positional information transmitting means, and transmits positional information of the smartphone 40 to the multi-function printer 20 at the time of performing the transmission of the print data using the data transmitting section 54. The reception or transmission timing of the print data or the switching of the Wi-Fi will be described below in detail.

The Internet 60 is a globally established network. The cloud storage 70 is a file server connected to the Internet 60. The cloud storage 70 may be installed by a communication carrier or a manufacturer of the smartphone 40 or may be installed by a third party. The cloud storage 70 may be established by one device or may be established by cooperating a plurality of devices connected to the Internet 60.

The cloud storage 70 includes an access managing section 72, a data managing section 74, and a data transmitting section 76. The access managing section 72 manages the access to the cloud storage 70 or the Internet 60. Specifically, a process of coping with a case where the file is referred to by using the URL or an authentication process at the time of referring to the file is performed. The data managing section 74 manages a storage destination of the data within the cloud storage 70. A file entity and a file path are managed in association with each other, and file entity or file information is returned according to a request. The data transmitting section 76 transmits the data. In a case where the transmission of the data corresponding to the URL is requested from the smartphone 40, the data is transmitted.

2. Description of Operation

Subsequently, an operation of the printing system 10 will be described with reference to FIGS. 2 to 8. FIG. 2 is a flowchart showing a procedure in a case where the user activates the print application on the smartphone 40 and inputs the print setting information. In a case where the user wants to print a photo captured by the smartphone 40 or a document managed by the smartphone 40, the user activates the print application (S10). Information for prompting the user to select printing target data is displayed on the print application, and the user selects data desired to be printed among various data items managed by the smartphone 40 (S12). For example, the data is selected in such a manner that the user opens a folder of photos or documents and touches desired data. The data entity may be stored in the smartphone 40 or may be stored in the cloud storage 70. However, the user may select the print data without being particularly conscious of the storage destination.

Subsequently, the user sets the print setting information of the print data (S14). In performing the settings, the default values may be used or may be changed to desired values from the default values. Accordingly, the print information including the print setting information is generated.

The user may immediately print by using the generated print setting information. However, in a case where the user performs the print setting at home or outdoors and the multi-function printer 20 is not present in the vicinity, the user stores the print setting information (S16), and closes the print applications (S18). The print application further has a function of selecting another print data and storing the print setting information. As stated above, the user sets the print data and the print setting information before the printing, and thus, an operation performed in front of the multi-function printer 20 is simplified.

FIG. 3 is a diagram showing an example of the print information including the generated print setting information. The illustrated print information is transmitted to the multi-function printer 20, and is also used for obtaining the data in the smartphone 40 or is used for providing information to the user of the smartphone 40. Thus, the print information includes information which is not used by the multi-function printer 20. As shown in this diagram, the print information includes a number (No.), a job ID, print setting information, amount of money, file obtaining destination, access information, terminal information, and positional information. Among these information items, the number and the job ID are used for managing the print information.

The print setting information is information indicating a mode in which the print data is printed. In the example of FIG. 3 in which a job ID is "JOB 1", "full color" is set for a color, a size of "A4" is set for a sheet, "2up" is set for Nup (the number of pages to be printed on the sheet), and "single-sided binding" is set for single-sided or double-sided printing in order to perform binding in the single-sided printing. The printing in the multi-function printer 20 is performed according to the print setting information.

The amount of money is the amount of money charged to the user at the time of using the multi-function printer 20, and is included in the print setting information for the convenience of the user. The amount of money is determined according to the print mode, and is calculated according to data stored in advance by the print application.

The file obtaining destination is information that specifies whether or not there is the print data, and is described in a URL format. In the illustrated example, a path and a file name are described as "file://aaaaa/bbbbb/Document.pdf" in a file stored in a local storage destination of the smartphone 40 by using the file scheme. A host name, a path, and a file name are described as "https://cloudservice/storage/Photo.jpg" in a file stored in the cloud storage 70 by using the https scheme.

The access information is authentication information necessary in a case where the access to the file obtaining destination is performed. The terminal information is device model information of the smartphone 40 or ID information specific to the smartphone 40. The positional information is information for specifying the position of the smartphone 40.

The file obtaining destination, the access information, the terminal information, and the positional information are print-related information items which are not used in the printing of the multi-function printer 20. However, there is room for improvement in service in the multi-function printer 20 by transmitting these print-related information items to the multi-function printer 20. As such an example, there is a mode in which a process of changing a wait time for the reception of the print data depending on the file obtaining destination in the multi-function printer 20. The multi-function printer 20 may verify that a person who presents the QR code and a person who transmits the print data are the same by using the terminal information. The multi-function printer 20 may check whether or not the user is present near the multi-function printer 20 by using the positional information.

Figure 4:
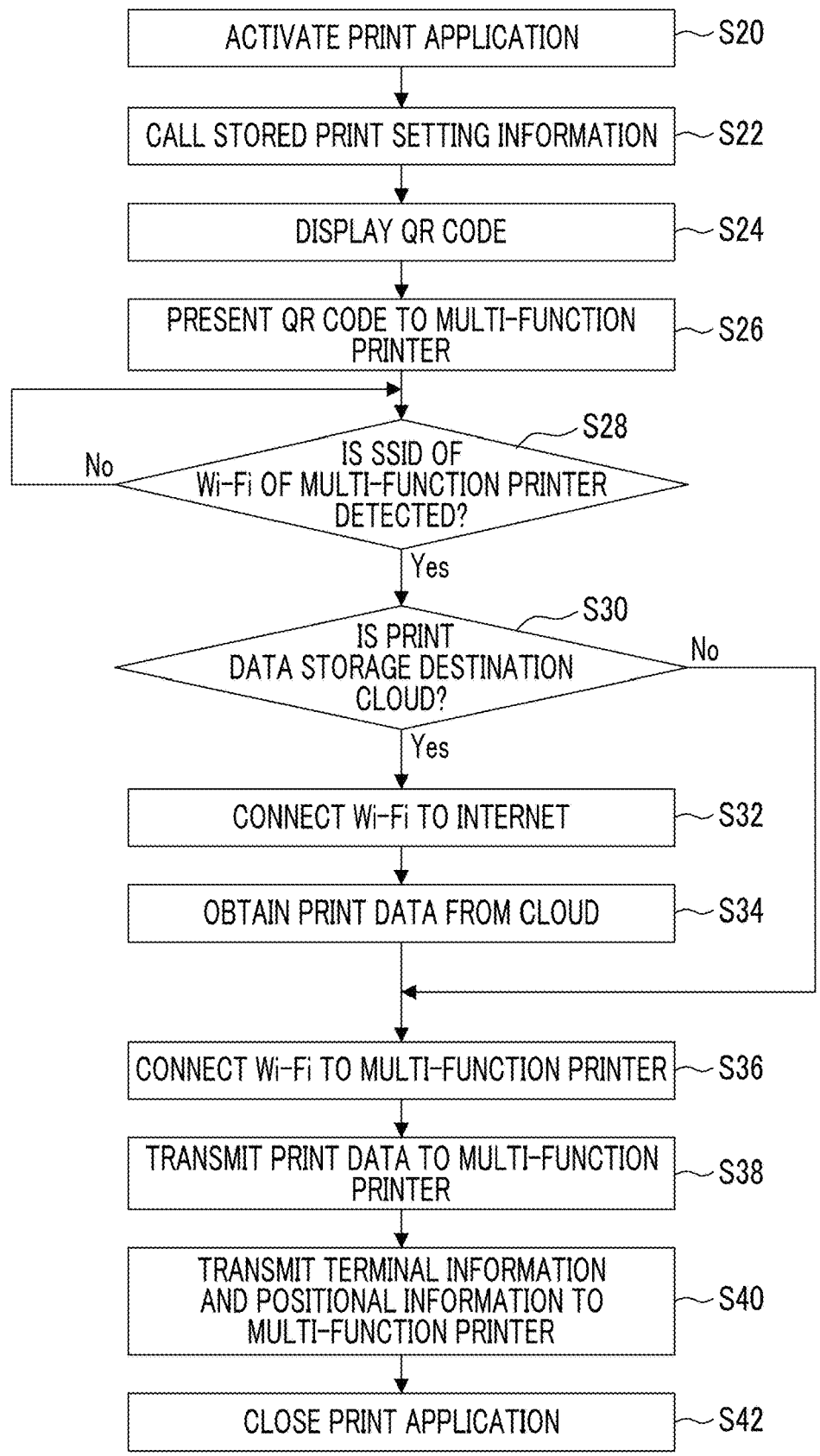
FIG. 4 is a flowchart showing a print instructing procedure in the smartphone.

FIG. 4 is a flowchart for describing a procedure of transmitting the print data to the multi-function printer 20 from the smartphone 40. In this example, it is assumed that the user visits the convenience store after some time elapses from when the procedure shown in FIG. 2 is performed and performs the printing.

The user initially activates the print application by operating the smartphone 40 (S20), and calls the print information including the previously stored print setting information for print data desired to be printed (S22). The user displays the QR code of the print information including the print setting information on a display screen of the smartphone according to a guidance of the print application (S24). The multi-function printer 20 installed in the convenience store displays a guidance to the user such that the user places the QR code displayed on the display screen of the smartphone over the QR code reader 22. The user presents the QR code to the QR code reader 22 according to the guidance, and causes the QR code reader to read the QR code (S26). Thereafter, the print application of the smartphone 40 waits until the SSID of the Wi-Fi of the multi-function printer 20 is detected (S28).

Hereinafter, an example of the SSID will be described with reference to FIG. 5. FIG. 5 shows the SSID of the access point of the Wi-Fi detected by the Wi-Fi managing section 48 of the smartphone 40. In this example, access points "Softbank-001" and "Docomo-001" of the Wi-Fi which are respectively provided by Softbank (registered trademark) and Docomo (registered trademark) which are major mobile carriers in Japan are displayed in the fields of Nos. 1 and 2. In a case where the smartphone 40 is connected to these access points, since the smartphone is connected to the Internet 60, the smartphone may communicate with the cloud storage 70. A Wi-Fi access point of "CVS-PrintService" of the multi-function printer 20 is displayed in the field of No. 3. In a case where the smartphone 40 is connected to this access point, the smartphone can communicate with the multi-function printer 20 through the closed network 30.

Referring back to FIG. 4, the description is continued. In a case where the print execution multi-function printer detecting section 50 detects the SSID of the multi-function printer 20 represented in the field of No. 3 of FIG. 5, the smartphone 40 determines that the event in which the multi-function printer 20 that prints the print data is determined occurs. Accordingly, the smartphone 40 starts a process of transmitting the print data. Specifically, the smartphone 40 reads an item of the file obtaining destination of the print information shown in FIG. 3, and determines whether or not the storage destination of the print data is the cloud storage 70 or the local storage destination of the smartphone 40 (S30).

In a case where the storage destination of the print data is the cloud storage 70, the Wi-Fi managing section 48 connects the Wi-Fi to the access point for the Internet 60 (S32). The data receiving section 52 obtains the print data through the Wi-Fi (S34), and stores the obtained print data in the local storage destination of the smartphone 40. Subsequently, the Wi-Fi managing section 48 connects the Wi-Fi to the access point of the multi-function printer 20 (S36), and the data transmitting section 54 transmits the print data to the multi-function printer through the Wi-Fi (S38). Meanwhile, in a case where the storage destination of the print data is the local storage destination of the smartphone 40, the Wi-Fi managing section 48 immediately connects the Wi-Fi to the access point of the multi-function printer 20 (S36), and the data transmitting section 54 transmits the print data to the multi-function printer 20 through the Wi-Fi (S38).

At a point of time when the print data is transmitted in step S38 (immediately before, while, or immediately after the print data is transmitted), the current terminal information and positional information of the smartphone 40 are transmitted to the multi-function printer 20 (S40). The print application may obtain information regarding the printing completion of the printing through the Wi-Fi, and may performs a service for displaying the information on the screen. The user may subsequently print another print data which already stores the print setting information. The print application is closed by the user or automatically at an appropriate timing (S42). As stated above, since the printing is performed on the print application based on the contents set in advance and the print application copes with the complicated process for the transmission of the print data, the user may simply and smoothly perform the printing in front of the multi-function printer 20. In the convenience store, many users may efficiently use the multi-function printer 20.

After the user places the QR code over the multi-function printer 20 in S26, processes until the print data is transmitted to the multi-function printer 20 in S38 are set so as to be automatically performed without inquiring of the user under the control of the print application. Accordingly, the user does not need to be conscious of whether the print data is stored in the cloud storage 70 or the local storage destination. For example, in a case where the procedure of S32 and S34 is automatically performed without inquiring of the user, the processes are seamlessly performed without the user being conscious of a difference between the storage destinations of the print data.

However, before the Wi-Fi managing section connects the Wi-Fi to the multi-function printer 20 in S36 or before the print data is transmitted in S38, the print application may present a button for requesting the user to permit the execution thereof, and may perform a process of transmitting the print data while interacting with the user in a case where the button is pressed. For example, in a step of connecting the Wi-Fi to the Internet 60 in S32 or a step of obtaining the print data from the cloud storage 70 in S34, the print application may cause the user to manage the process by displaying a button for requesting the user to permit the execution thereof. In such a case, the user may obtain the print data from the cloud storage 70 by performing the process according to the presented contents on the print application, and may transmit the obtained print data to the multi-function printer. Accordingly, even in a case where the user does not ascertain a difference between the storage destinations of the print data or a difference between the Wi-Fi connection destinations, the print data is steadily transmitted.

FIG. 6 is a flowchart showing processes performed by the multi-function printer 20 in the procedure shown in FIG. 4. In a case where the user presents the QR code of the smartphone 40 to the QR code reader 22, the multi-function printer 20 analyzes a code pattern, and reads the print information including the print setting information (S50). The multi-function printer 20 activates the application program for performing the printing from the smartphone 40, and performs the process under the control of this program. Specifically, the Wi-Fi managing section 24 initially activates the Wi-Fi (S52). Accordingly, the smartphone 40 detects the SSID of the access point shown in FIG. 5. The multi-function printer 20 instructs the user to pay a print fee according to the print information, and accepts the inserted fee (S54). Subsequently, the multi-function printer 20 obtains the print data through the Wi-Fi (S56), and obtains the terminal information and the positional information of the smartphone 40 (S57). Thereafter, the multi-function printer performs the printing according to the print setting information (S58).

The terminal information obtained in step S57 can be used for checking whether or not the smartphone 40 that reads the QR code and the smartphone 40 that receives the print data are the same. The positional information obtained in step S57 is not particularly required in a case where the print data is promptly obtained in step S56 after the Wi-Fi is activated in step S52. However, in a case where it takes a relatively long time (for example, 10 seconds or more, 15 seconds or more, 30 seconds or more, 60 seconds or more, or 90 seconds or more) to obtain the print data, a possibility that the user will move from the front of the multi-function printer 20 in the meantime is considered. In this state, in a case where the printing is performed, it is considered that the user forgets to take the printed sheet. Thus, in a case where it takes a long time to obtain the print data and the smartphone 40 is far away from the multi-function printer 20 with a predetermined distance (for example, 5 m, 10 m, or 20 m), a measure to temporarily or completely stop the printing or a warning for the smartphone 40 may be performed. Instead of obtaining the positional information from the smartphone 40, the position of the user may be calculated by a sensor (a visible camera, an infrared sensor, or an ultrasonic sensor) of the multi-function printer 20.

Figure 7:
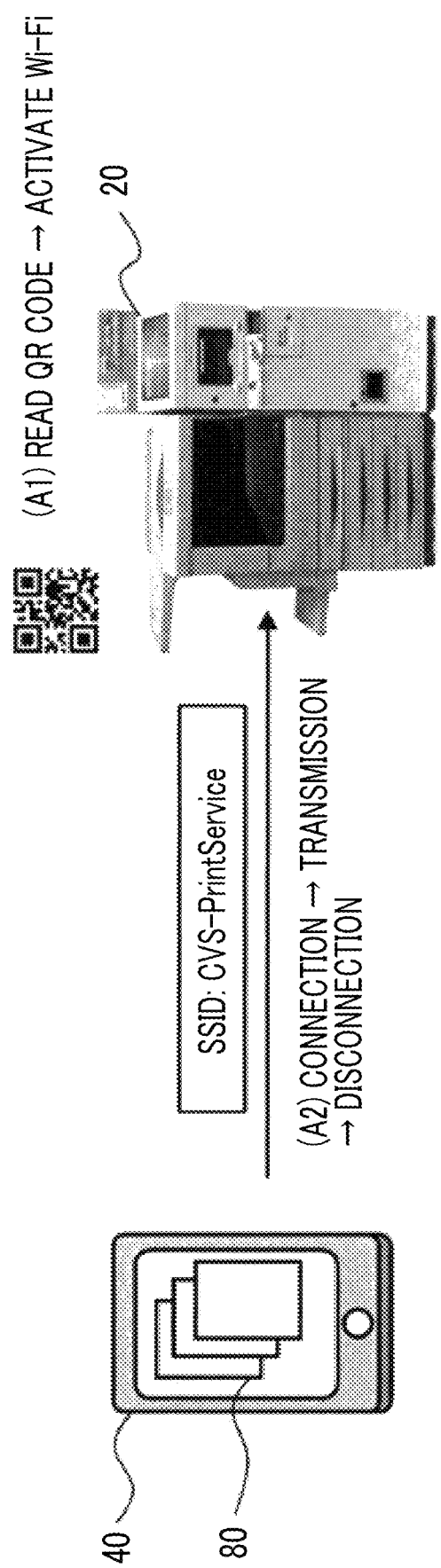
FIG. 7 is an explanatory diagram showing a case where print data is stored in the smartphone.

Next, a flow of the Wi-Fi connection and the print data transmission will be described with reference to FIGS. 7 and 8. FIG. 7 is a diagram in a case where the print data is stored in the smartphone 40, and FIG. 8 is a diagram in a case where the print data is stored in the cloud storage 70.

As shown in FIG. 7, the multi-function printer 20 activates the Wi-Fi after the QR code is read (A1). The smartphone 40 checks a location of print data 80 after the access point of the Wi-Fi of the multi-function printer 20 is detected. In a case where the entity of the print data 80 is stored in the smartphone 40, the smartphone 40 is connected to the Wi-Fi access point of the multi-function printer 20, transmits the print data, and disconnects the Wi-Fi (A2).

Figure 8:
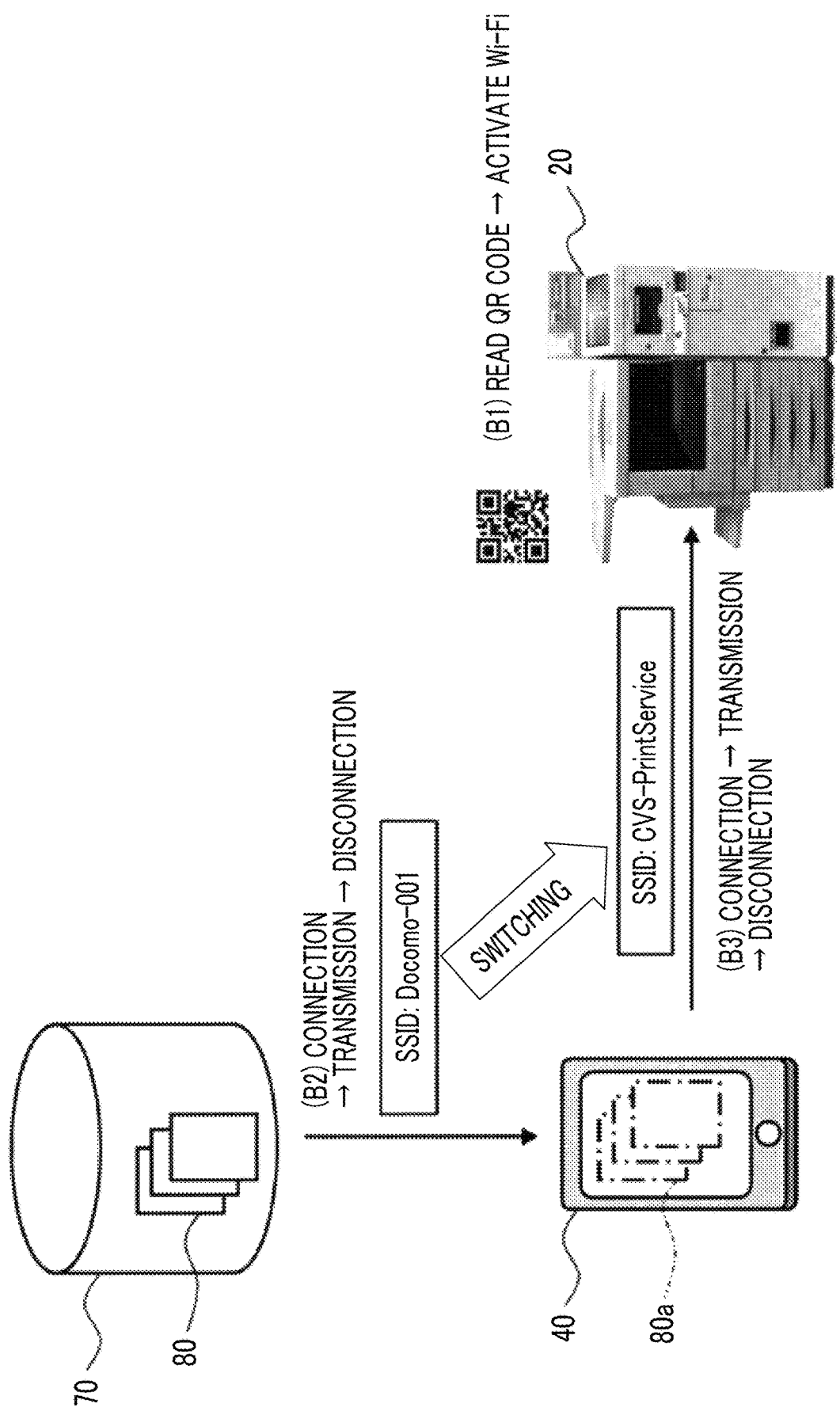
FIG. 8 is an explanatory diagram in a case where the print data is stored in a storage destination connected to the Internet.

In contrast, as shown in FIG. 8, in a case where the entity of the print data 80 is stored in the cloud storage 70 and only corresponding file information 80a is retained in the smartphone 40, it is necessary to download the print data 80 to the smartphone. Thus, after the QR code is presented (B1), the smartphone 40 is initially connected to the Wi-Fi access point for being connected to the Internet 60, and obtain the print data 80 from the cloud storage 70. The Wi-Fi connection is disconnected after the print data is obtained (B2). Thereafter, the smartphone 40 is connected to the Wi-Fi access point of the multi-function printer 20, and transmits the print data (B3).

3. Modification Examples

The aforementioned exemplary embodiment can be variously modified within the scope of the present invention. Hereinafter, modification examples of the exemplary embodiment will be described.

Figure 9:
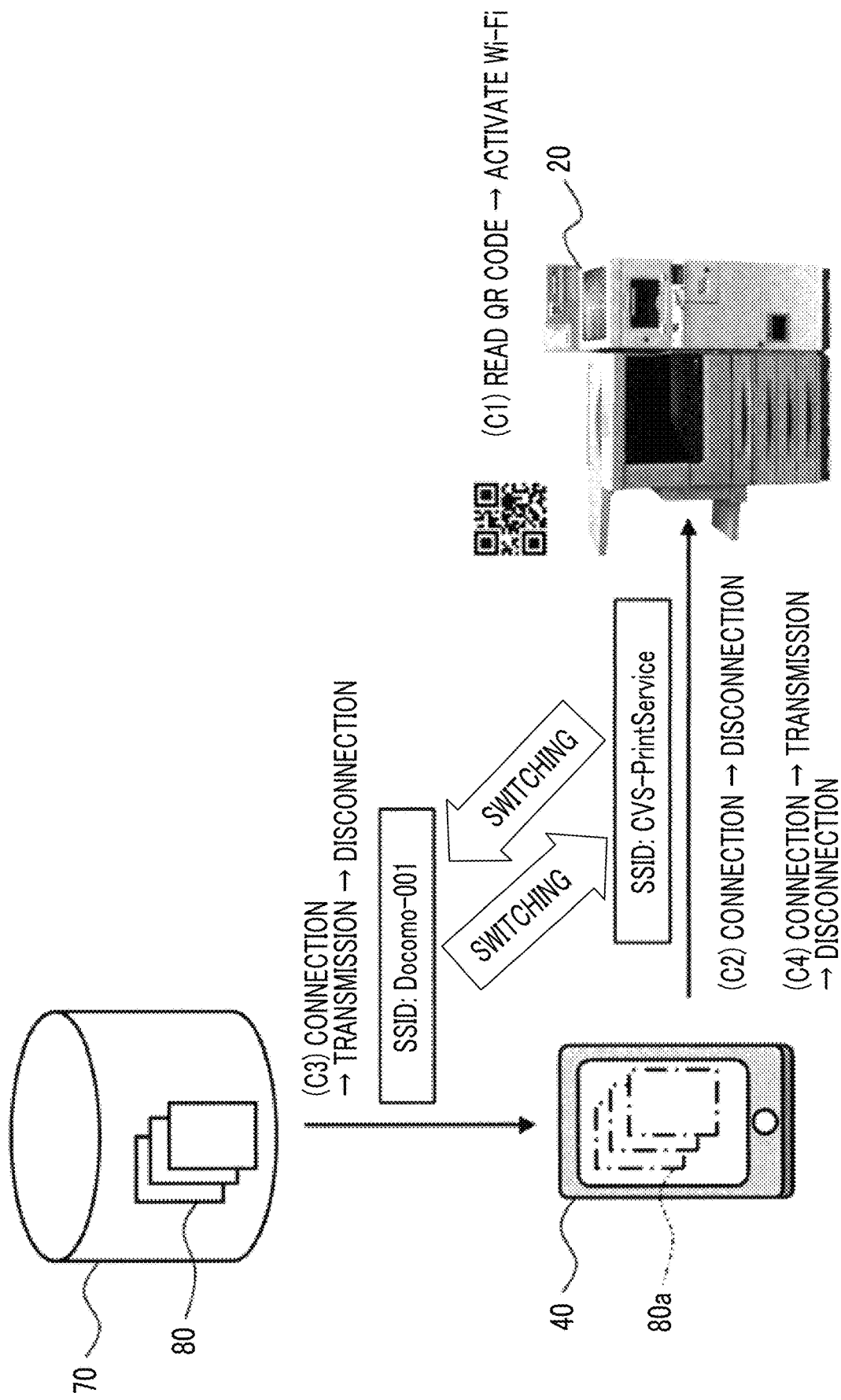
FIG. 9 is an explanatory diagram in a case where the smartphone and the multi-function printer are initially connected.

FIG. 9 is a diagram corresponding to FIG. 8, and shows a modification example in a case where the print data 80 is stored in the cloud storage 70. In this example, after the multi-function printer 20 reads the QR code and activates the Wi-Fi (C1), the smartphone 40 is connected to the Wi-Fi access point of the multi-function printer 20. Thus, in a case where the print data 80 is stored in the smartphone 40, the print data is immediately transmitted to the multi-function printer 20. As shown in FIG. 9, in a case where the print data 80 is stored in the cloud storage 70, the smartphone disconnects the Wi-Fi connection with the multi-function printer 20 once (C2). The subsequent procedure is the same as the procedure shown in FIG. 8. That is, the smartphone is connected to the Wi-Fi access point for being connected to the Internet 60, obtains the print data stored in the cloud storage 70, and disconnects the connection (C3). The smartphone is connected to the Wi-Fi access point of the multi-function printer 20, and transmits the print data again (C4).

With such a configuration, the smartphone 40 may transmit and receive any information to and from the multi-function printer 20 at the time of being initially connected to the Wi-Fi access point of the multi-function printer 20. For example, in a case where the print information including the print setting information is not completely stored in the QR code, the whole or remaining print information may be transmitted to the multi-function printer 20 from the smartphone 40. The latest positional information may be transmitted to the multi-function printer 20 from the smartphone 40 and the multi-function printer 20 may check whether or not the smartphone 40 is present near the multi-function printer 20 at a point of time when the latest positional information is transmitted. Alternatively, the device model information of the smartphone 40 may be transmitted to the multi-function printer 20 from the smartphone 40, and the multi-function printer 20 may check whether or not the smartphone 40 that presents the QR code and the smartphone 40 connected to the Wi-Fi are the same.

Figure 10:
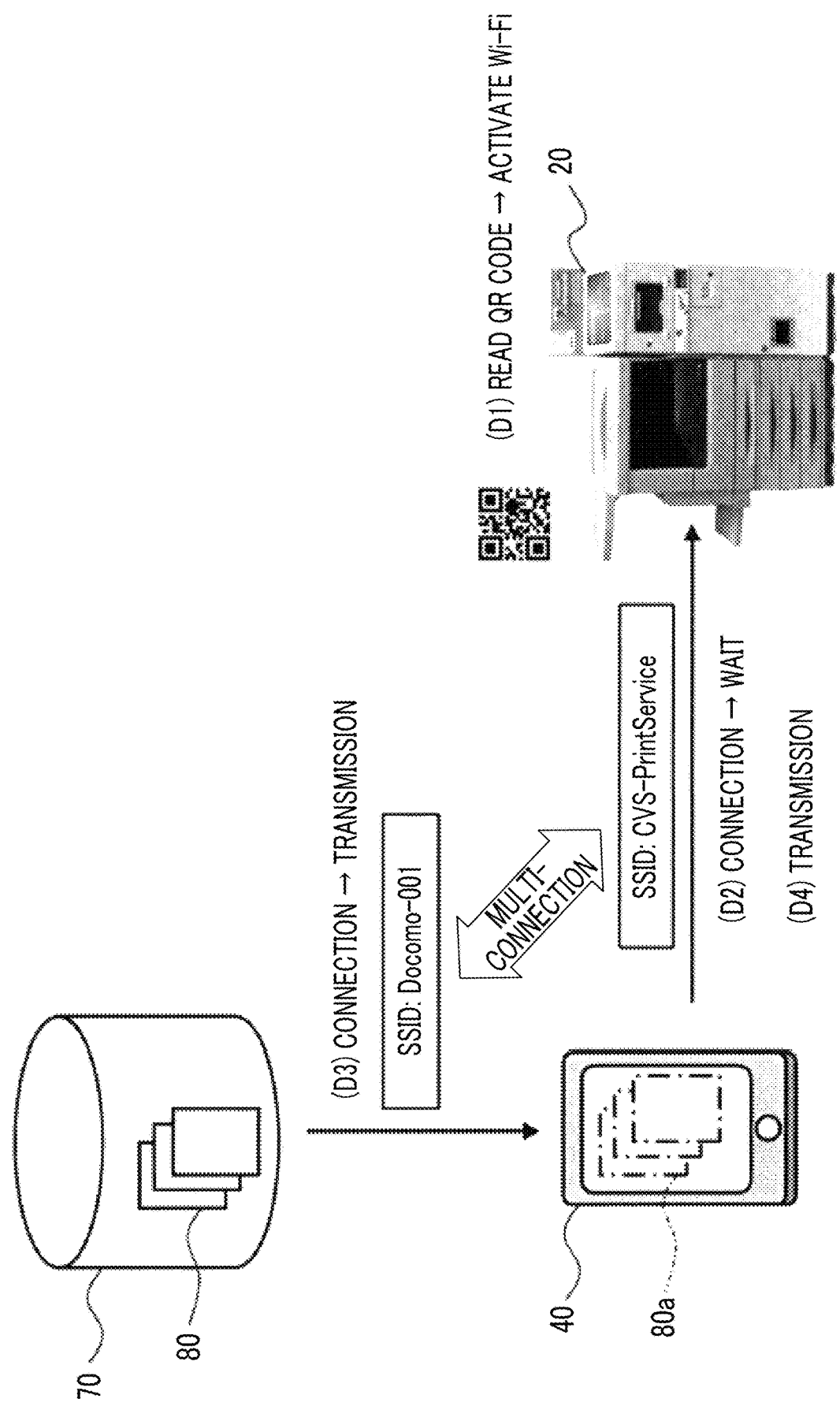
FIG. 10 is an explanatory diagram in a case where the smartphone is able to be simultaneously connected to a plurality of communication destinations.

FIG. 10 is a diagram corresponding to FIGS. 8 and 9, and shows another modification example in a case where the print data 80 is stored in the cloud storage 70. It has been described in the exemplary embodiment and the modification example of FIGS. 8 and 9 that the Wi-Fi is not able to be simultaneously connected to a plurality of access points and is able to be connected to only one access point, it is assumed that multi-connection enabling the Wi-Fi to be simultaneously connected to a plurality of access points is able to be performed in the modification example of FIG. 10.

Similarly to the modification example shown in FIG. 9, in the modification example shown in FIG. 10, after the Wi-Fi of the multi-function printer 20 is activated (D1), and the smartphone is connected to the access point of the Wi-Fi. In a case where the print data is stored in the cloud storage 70, the smartphone waits in a state in which the connection is established without disconnecting the Wi-Fi of the multi-function printer 20 (D2). Subsequently, the smartphone 40 is connected to the Wi-Fi access point for being connected to the Internet 60, and obtains the print data 80 (D3). In this step, the smartphone may immediately disconnect the Wi-Fi connection for being connected to the Internet 60, or may wait in a state in which the connection is established in order to prepare for the next communication. Thereafter, the smartphone 40 transmits the print data to the multi-function printer 20 by using the Wi-Fi connection of the multi-function printer 20 being in the wait state (D4). In a case where the standard of the Wi-Fi supports such multi-connection, the smartphone 40 can implement the multi-connection by programming for activating a process for each connection destination.

Figure 11:
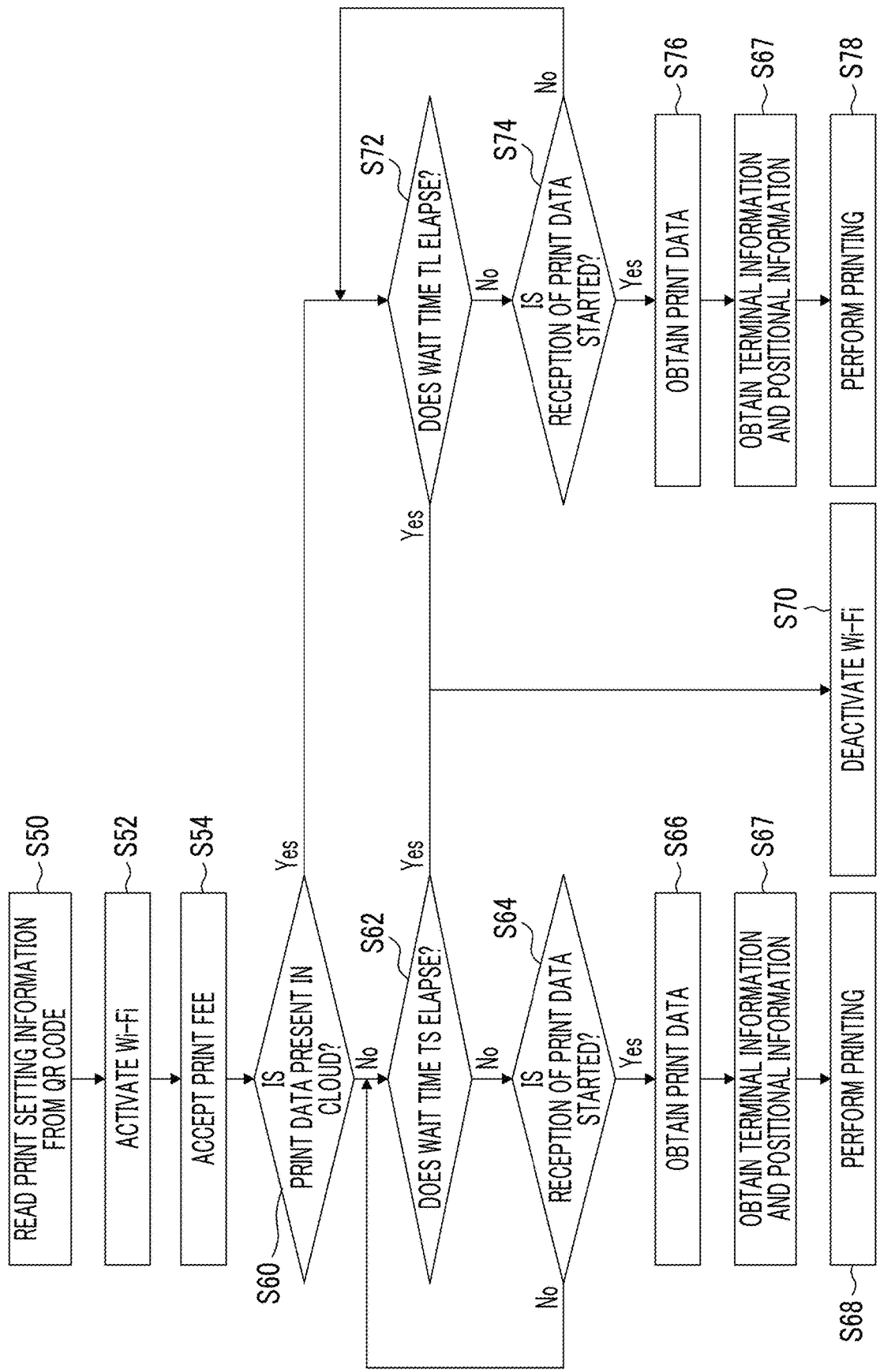
FIG. 11 is a flowchart showing a change of a setting of a wait time corresponding to the storage destination.

Now, a modification example of the processes of the multi-function printer 20 shown in FIG. 6 will be described with reference to FIG. 11. FIG. 11 is a flowchart corresponding to FIG. 6, and steps S50, S52, and S54 are the same as those in FIG. 6. However, the modification example shown in FIG. 11 is different from the exemplary embodiment of FIG. 6 in that the process corresponding to the location of the print data is performed.

In this modification example, the multi-function printer 20 determines whether or not the print data is stored in the cloud storage 70 while referring to information of the file obtaining destination of the print information shown in FIG. 3 (S60). In a case where the print data is not stored in the cloud storage 70 and is stored in the local storage destination of the smartphone 40, await time TS is set. The multi-function printer determines whether or not the wait time TS elapses (S62), and checks whether or not the reception of the print data is started in a case where the wait time does not elapse (S64). In a case where the reception is started, the multi-function printer obtains the print data (S66), obtains the terminal information and the positional information (S67), and performs the printing (S68). In a case where the reception is not started, the multi-function printer returns to step S62, and checks whether or not the wait time TS or more elapses. Meanwhile, in a case where the wait time TS elapses in step S62, the multi-function printer deactivates the Wi-Fi (S70). Accordingly, the access after the long time elapses is restrained. In a case where the user attempts to perform the printing again, the user presents the QR code again.

In a case where the multi-function printer determines that the print data is stored in the cloud storage 70 in step S60, await time TL is set. The wait time TL is set to be longer than the wait time TS in a case where the print data is stored in the local storage destination of the smartphone 40 (TL>TS). The multi-function printer checks the reception of the print data (S74) until the wait time TL elapses (S72), and performs the printing (S78) in a case where the print data is obtained (S76). Meanwhile, in a case where the wait time TL elapses, the multi-function printer deactivates the Wi-Fi (S70).

As stated above, the reason why the wait time is changed depending on the location of the print data is because it is expected that it takes a longer time to receive the print data in a case where the print data is stored in the cloud storage 70, as compared to a case where the print data is stored in the local storage destination of the smartphone 40. The wait time becomes a wait time corresponding to the location of the print data by increasing the wait time TL by a time considered to be necessary for the smartphone 40 to obtain the print data from the cloud storage 70. For example, a length of the wait time TL is able to be variously set, but it is considered that the wait time TL is further increased by about 5 seconds, 10 seconds, 15 seconds, 30 seconds, or 60 seconds than the wait time TS.

It has been described that the smartphone 40 performs the obtainment and transmission of the print data by using the Wi-Fi. However, the smartphone 40 may generally use a communication standard for mobile devices, such as Long Term Evolution (LTE) in addition to the Wi-Fi. Thus, one or both of the obtainment and transmission of the print data may be performed through wireless communication of another communication standard such as LTE. Communication using a wireless communication standard that assumes a short distance, such as Bluetooth, may be performed as long as a practical communication speed is able to be secured.

It has been described that the print information including the print setting information is transmitted to the multi-function printer 20 from the smartphone 40 by using the QR code. However, the print information may be transmitted through the wireless communication instead of transmitting the image information such as the QR code. Specifically, an example in which Near Field Communication (NFC) or Bluetooth which is a wireless communication standard for short distances is used is illustrated. Of course, the same communication standard as the communication standard in the transmission of the print data, such as Wi-Fi or LTE, may be performed.

4. Summarization of Disclosure Matters

A mobile terminal device according to an exemplary embodiment includes a print data selecting unit, a communication establishing unit, a detection unit, an obtainment unit, and a data transmitting unit. The mobile terminal device is a device capable of being easily carried by a user. Examples of the mobile terminal device include a smartphone, a tablet, a portable personal computer (PC), and a multi-function mobile phone.

The print data selecting unit selects print data in response to a user operation. The print data may be data of which entity is stored in the mobile terminal device, or may be data of which entity is stored in an accessible external device. In the mobile terminal device or the image forming apparatus, the data to be printed is generally used in a format called a file. In the present specification, data and a file are described as the substantially same meaning, and print data and print file are also described as the substantially same meaning.

The communication establishing unit establishes wireless communication with a network. Accordingly, the mobile terminal device is set in a state in which wireless communication with a network is able to be performed. The network is a communication path set such that communication is able to be performed between a plurality of apparatuses. It is not necessary for the plurality of apparatuses to be connected to the network, and it is assumed that even a communication path to which only a certain apparatus to which the mobile terminal device desires to be connected is connected is called a network.

A method of the wireless communication used by the communication establishing unit is not particularly limited. Examples of the wireless communication may include Wi-Fi which is a communication standard of a wireless LAN or LTE which is a communication standard of a mobile phone. The communication establishing unit may establish wireless communication using a plurality of communication standards such as Wi-Fi and LTE. For example, a mode in which the communication in the obtainment unit is performed by using a first communication standard and transmission in the data transmitting unit is performed by a second communication standard different from the first communication standard may be used. The communication using the obtainment unit or the communication using the communication establishing unit may not be fixed to a specific communication standard, and a communication standard with a good communication state may be appropriately selected.

The detection unit detects an event in which an image forming apparatus connected to a first network is selected as a printing destination of the print data. The image forming apparatus is an apparatus having a function of printing on a printing medium such as a sheet based on the print data. In the exemplary embodiment, it is assumed that a state in which a specific image forming apparatus is ultimately selected in a state in which an image forming apparatus that performs the printing is not determined. It is assumed that the event in which a certain image forming apparatus is selected as the printing destination in this state includes an event in which a certain image forming apparatus becomes a candidate of the printing destination and an event in which a certain image forming apparatus is actually selected as the printing destination. The event is any event capable of being detected in the mobile terminal device, such as an operation performed by the user, information detected by the sensor, or specific processing in information processing or communication processing.

Examples of the event in which the certain image forming apparatus becomes the candidate of the printing destination include the detection of a signal output from the image forming apparatus as a selection candidate, the starting of the communication with the image forming apparatus as a selection candidate, and an operation for displaying information (name, positional information, appearance image, and access information) of the image forming apparatus as the selection candidate on the screen of the mobile terminal device. Examples of the event in which the image forming apparatus is selected as the printing destination include an operation for selecting a specific image forming apparatus for which the user performs the printing and a process (a process for obtaining the information of the selected image forming apparatus or a process of starting the communication with the selected image forming apparatus) performed in the mobile terminal device based on the selection operation. In general, a possibility that the printing will be performed in a case where these events are performed at a distance close to the image forming apparatus (a distance with which the image forming apparatus or facilities in the installation place thereof is actually viewed by the user) is higher than a possibility that the printing will be performed in a case where these events are performed at a distance far away from the image forming apparatus. Thus, a condition in which a distance between the user or the smartphone 40 and the image forming apparatus is less than a predetermined distance (for example, 50 m, 20 m, 10 m, or 5 m) may be added as a condition in which the event in which the image forming apparatus is selected as the printing destination is detected. The movement performed such that the distance between the user or the smartphone 40 and the image forming apparatus is less than the predetermined distance may be independently detected as the event in which this image forming apparatus is selected as the printing destination. In a case where the user or the smartphone is far away from the image forming apparatus, since it is sufficiently considered that a possibility that the printing will be performed in a specific image forming apparatus increases, the aforementioned event may be detected irrespective of the distance.

The obtainment unit obtains the print data from a storage destination connected to a second network different from the first network through wireless communication with the second network established by the communication establishing unit after the detection unit detects the event, in a case where the print data is stored in the storage destination connected to the second network. In a case where at least an authority given to the mobile terminal device is considered, the second network is a network for which communication is not able to be physically performed from the first network or a network for which physical connection is performed but communication is not able to be performed from the first network through the access restriction. After the detection unit detects the event in which the image forming apparatus is selected as the printing destination, that is, after a print execution possibility using this image forming apparatus increases, the obtainment unit obtains the print data from the storage destination connected to the second network. The establishment of the wireless communication with the second network using the communication establishing unit may be performed before or after the event is detected. For example, in a case where the user activates the print application while accessing to the second network, it is considered that the connection with the second network is already established. Meanwhile, in a case where the connection with the second network is not established, it is necessary to perform the connection with the second network in this step. With this configuration, since the print data is obtained at least after the event is detected, the mobile terminal device does not need to download the print data stored in the storage destination connected to the second network in a state in which there is a low possibility that the printing will be performed.

The data transmitting unit transmits the print data obtained by the obtainment unit to the image forming apparatus through the wireless communication with the first network established by the communication establishing unit. In a case where the print data is stored in the mobile terminal device in advance, the print data is transmitted to the image forming apparatus. Accordingly, the print data is transmitted to the image forming apparatus irrespective of the storage destination of the print data.

In the mobile terminal device according to the exemplary embodiment, the detection unit detects the event in a case where connection information of the wireless communication with the first network is detected. The connection information of the wireless communication with the first network is information necessary for accessing to the first network through the wireless communication. In a case where the connection information is detected, since a high possibility that the image forming apparatus connected to the first network will be the printing destination increases, the event in which the image forming apparatus that performs the printing is selected is detected. Examples of the event detected by the detection unit include an event in which the connection information of the wireless communication is detected, an event in which the information of the image forming apparatus connected to the first network is obtained by using the detection result of the connection information, an event in which the detection result of the connection information is displayed on the screen, and an event in which the connection of the wireless communication with the first network is performed based on the connection information.

In the mobile terminal device according to the exemplary embodiment, the communication establishing unit establishes connection with the network through wireless communication using Wi-Fi, and the detection unit detects the event in a case where an access point of Wi-Fi for the image forming apparatus is detected as the connection information of the wireless communication with the first network.

The mobile terminal device according to the exemplary embodiment further includes a print setting information setting unit that sets print setting information of the print data in response to a user operation, and a transmission unit that transmits the print setting information to the image forming apparatus. The detection unit detects the event in a case where the transmission is performed by the transmission unit. In a case where the print setting information is transmitted, since there is a high possibility that the printing will be performed in this image forming apparatus, the event in which the image forming apparatus is selected as the printing destination is detected. Examples of the event detected by the detection unit include an event in which the image forming apparatus as a transmitting destination of the transmission unit is specified, an event in which the transmission to the image forming apparatus as the transmitting destination is performed, and an event in which there is a response from the image forming apparatus as the transmitting destination.

The print setting information is information indicating a method of printing on a printing medium. Specific examples of the print setting information include a setting for a sheet size, a setting for a sheet direction, a setting for the number of sheets to be printed, a setting for the number of pages to be printed on one sheet, a setting for color or monochrome printing, a setting for single-sided printing or double-sided printing, and a setting for fastening using a stapler. The transmission unit may transmit the print-related information which is not directly used in the printing in addition to the print setting information. Examples of the print-related information include storage destination information of the print data, name information of the print data, specific information of the mobile terminal device, and positional information of the mobile terminal device.

Means for transmitting the print setting information using the transmission unit to the image forming apparatus is not particularly limited, and various methods such as wireless communication, wired communication, voice communication, visible light communication, and infrared communication may be used. For example, the transmission unit may transmit the print setting information by displaying the image information corresponding to the print setting information on the mobile terminal device and reading the image information into the image forming apparatus. Examples of the image information include a two-dimensional code such as a QR code. For example, the transmission unit may transmit the print setting information to the image forming apparatus through the wireless communication different from the wireless communication established by the communication establishing unit. Examples of the wireless communication include short-distance wireless communication (NFC or Bluetooth). For example, the transmission unit may transmit the print setting information to the image forming apparatus through the wireless communication to which the communication establishing unit is connected.

In the mobile terminal device according to the exemplary embodiment, the transmission unit transmits the print setting information to the image forming apparatus by using short-distance wireless communication, and the detection unit detects the event in a case where the transmission is performed through the short-distance wireless communication. The short-distance wireless communication is a wireless standard assuming that communication is performed at a distance of about 1 cm to 10 m. Specifically, examples of the short-distance wireless communication include NFC and Bluetooth.

In the mobile terminal device according to the exemplary embodiment, the detection unit detects the event in a case where information of the image forming apparatus is displayed on a screen of the mobile terminal device. The information of the image forming apparatus displayed on the screen is information capable of identifying the image forming apparatus. As a specific example, there are the name, positional information, appearance image, and access information of wireless communication of the image forming apparatus. For example, in a case where the mobile terminal device detects the radio waves output from the image forming apparatus or a case where the mobile terminal device detects that the image forming apparatus is present near the mobile terminal device through the comparison of the positional information of the image forming apparatus retained by the print application in advance with the current positional information, it is considered that the print application prompts the user to perform the operation such as the selection by displaying the information of the image forming apparatus on the screen. In such a case, there is a high possibility that the printing will be performed in this image forming apparatus, and the event in which this image forming apparatus is selected as the printing destination is detected. The event detected by the detection unit may be an event in which the screen display is performed on the screen or may be an event performed subsequently as the result of the screen display. Examples of the subsequently performed event includes an event in which a positive operation is performed on the screen display content like a case where the user presses a confirmation button on the displayed screen and an event in which a predetermined time elapses after the screen display is started.

In the mobile terminal device according to the exemplary embodiment, the detection unit detects the event in a case where at least one of transmission of print setting information or the transmission of the print data is requested or prompted from the image forming apparatus. For example, it is assumed that a setting is performed such that the user transmits the print setting information or transmits the print data from the mobile terminal device by initially operating the GUI of the image forming apparatus. At this time, the image forming apparatus requests or prompts the mobile terminal device to perform at least one of the transmission of the print setting information or the transmission of the print data. Thus, the event in which the image forming apparatus is selected as the printing destination is detected. Examples of the event detected by the detection unit include an event in which the mobile terminal device accepts the communication requested or prompted from the image forming apparatus and an event in which the communication result is displayed on the screen.

In the mobile terminal device according to the exemplary embodiment, simultaneous establishment of wireless communication with two or more networks using the communication establishing unit is not permitted, and the communication establishing unit enables the transmission of the print data using the data transmitting unit by disconnecting the wireless communication with the second network after the print data is obtained by the obtainment unit from the storage destination connected to the second network and establishing the wireless communication with the first network. That is, the communication establishing unit is not able to be simultaneously connected to a plurality of communication destinations in a wireless manner, and is not able to establish the connection with another network unless the connection with a certain network is disconnected. For example, the communication establishing unit may initially establish the wireless communication with the first network, and may establish the wireless communication with the second network by disconnecting the connection with the first network in a case where it is necessary to obtain the print data using the obtainment unit.

In the mobile terminal device according to the exemplary embodiment, the communication establishing unit enables simultaneous establishment of wireless communication with a plurality of networks, and simultaneously establishes wireless communication with the first network and the second network. The communication standards of the wireless communication simultaneously established may be the same or may be different. For example, in this exemplary embodiment, after the detection unit detects the event, the wireless communication with the first network is established by the communication establishing unit. In a case where the print data is stored in the storage destination connected to the second network, the communication establishing unit causes the obtainment unit to obtain the print data by maintaining the communication with the first network in the wait state and separately establishing the connection with the second network. Subsequently, the communication establishing unit may enter a state in which the data transmitting unit transmits the print data to the image forming apparatus by disconnecting the connection with the second network, maintaining the wait state, and resuming the communication with the first network.

In the mobile terminal device according to the exemplary embodiment, the image forming apparatus may be an apparatus to be used by a large number of unspecified users. The image forming apparatus is typically installed in facilities (stores such as a convenience store, private facilities such as an event venue and a hotel lobby, and public facilities) visited by a large number of unspecified users, and is set so as to be used by users other than the specific user. For example, the usage fee may be charged or free. In the image forming apparatus to be used by a large number of unspecified users, an operating procedure of the user needs to be simplified such that the printing is able to be smoothly performed by even a user who is unfamiliar with an operation. The image forming apparatus according to the exemplary embodiment may be an apparatus to be used by a large number of specified users or a small number of specified users. Examples of the image forming apparatus include an image forming apparatus which is installed in an organization such as a company or a public organization and is used by members of such an organization.

A mobile terminal program according to an exemplary embodiment causes a mobile terminal device to function as a print data selecting unit, a communication establishing unit, a detection unit, an obtainment unit, and a data transmitting unit. The mobile terminal program is typically realized by controlling hardware of the mobile terminal device through cooperation between an application program (application) downloaded and installed on the mobile terminal device and basic software such as an operation system or another program installed in advance on the mobile terminal device. However, the mobile terminal program may be realized by a program in another form.

An image forming apparatus according to the exemplary embodiment includes an obtainment unit that obtains print setting information of print data from a mobile terminal device of a user, a reception unit that receives the print data, which is obtained by the mobile terminal device from a storage destination connected to a second network after the print setting information is obtained, from the mobile terminal device through a first network different from the second network, and a printing unit that prints the received print data according to the print setting information. The image forming apparatus may further include scanning means, FAX transmitting and receiving means, and mail transmitting and receiving means.

In the image forming apparatus according to the exemplary embodiment, information indicating whether the print data is stored in the storage destination connected to the second network or within the mobile terminal device is added to the print setting information, and the reception unit includes a wait time setting unit that sets a wait time to receive the print data such that the wait time in a case where the print data is stored in the storage destination connected to the second network is longer than the wait time in a case where the print data is stored within the mobile terminal device. A transmission timing of the print data is different depending on a difference between the storage destinations.

The image forming apparatus according to the exemplary embodiment further include a processing unit that performs a process of stopping the printing using the printing unit or a process of warning or notifying the mobile terminal device in a case where the mobile terminal device or the user is located relatively far from the image forming apparatus at the time of receiving the print data. In order to achieve this, the positional information of the mobile terminal device may be transmitted to the image forming apparatus in a point of time when the print data is transmitted from the mobile terminal device (immediately before, immediately after, or while the print data is transmitted). The image forming apparatus may detect the position of the user or the mobile terminal device by using a sensor.

An image forming program according to an exemplary embodiment causes an image forming apparatus to function as an obtainment unit, a reception unit, and a printing unit. The image forming program is typically realized by controlling hardware of the image forming apparatus through cooperation between one or a plurality of application programs installed on the image forming apparatus and basic software such as an operation system. However, the image forming program may be realized by a program in another form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile terminal device comprising:
    a storage medium; and
    a processor, coupled to the storage medium, wherein the processor is configured to function as:
        a print data selecting unit that selects print data in response to a user operation;
        a communication establishing unit that establishes wireless communication with a network;
        a detection unit that detects an event in which an image Raining apparatus connected to a first network is selected as a printing destination of the print data;
        an obtainment unit that obtains the print data from a storage destination connected to a second network different from the first network through wireless communication with the second network established by the communication establishing unit after the detection unit detects the event, in a case where the print data is stored in the storage destination;
        a data transmitting unit that transmits the print data obtained by the obtainment unit to the image forming apparatus through wireless communication with the first network established by the communication establishing unit;
        a print setting information setting unit that sets print setting information of the print data in response to a user operation; and
        a transmission unit that transmits the print setting information to the image forming apparatus, wherein the detection unit detects the event in a case where the transmission is performed by the transmission unit.

2. The mobile terminal device according to claim 1, wherein the detection unit detects the event in a case where connection information of the wireless communication with the first network is detected.

3. The mobile terminal device according to claim 2, wherein the communication establishing unit establishes wireless communication using Wi-Fi with the network, and
the detection unit detects the event in a case where an access point of Wi-Fi for the image forming apparatus is detected as the connection information of the wireless communication with the first network.

4. The mobile terminal device according to claim 1, wherein the transmission unit transmits the print setting information to the image forming apparatus by using short-distance wireless communication, and
the detection unit detects the event in a case where the transmission is performed through the short-distance wireless communication.

5. The mobile terminal device according to claim 1, wherein the detection unit detects the event in a case where information of the image forming apparatus is displayed on a screen of the mobile terminal device.

6. The mobile terminal device according to claim 1, wherein the detection unit detects the event in a case where at least one of transmission of print setting information or the transmission of the print data is requested or prompted from the image forming apparatus.

7. The mobile terminal device according to claim 1, wherein simultaneous establishment of wireless communication with two or more networks using the communication establishing unit is not permitted, and
the communication establishing unit enables the transmission of the print data using the data transmitting unit by disconnecting the wireless communication with the second network after the print data is obtained by the obtainment unit from the storage destination connected to the second network and establishing the wireless communication with the first network.

8. The mobile terminal device according to claim 1, wherein the communication establishing unit enables simultaneous establishment of wireless communication with a plurality of networks, and is simultaneously connected to the first network and the second network through wireless communication.

9. A non-transitory computer readable medium storing a mobile terminal program causing a processor of a mobile terminal device to function as:
a print data selecting unit that selects print data in response to a user operation;
a communication establishing unit that establishes wireless communication with a network;
a detection unit that detects an event in which an image forming apparatus connected to a first network is selected as a printing destination of the print data;
an obtainment unit that obtains the print data from a storage destination connected to a second network different from the first network through wireless communication with the second network established by the communication establishing unit after the detection unit detects the event, in a case where the print data is stored in the storage destination;
a data transmitting unit that transmits the print data obtained by the obtainment unit to the image forming apparatus through wireless communication with the first network established by the communication establishing unit;
a print setting information setting unit that sets print setting information of the print data in response to a user operation; and
a transmission unit that transmits the print setting information to the image forming apparatus,
wherein the detection unit detects the event in a case where the transmission is performed by the transmission unit.

* * * * *